Jan. 4, 1927. 1,613,064
J. A. THOMAS
PILOT LIGHT
Filed April 14, 1926
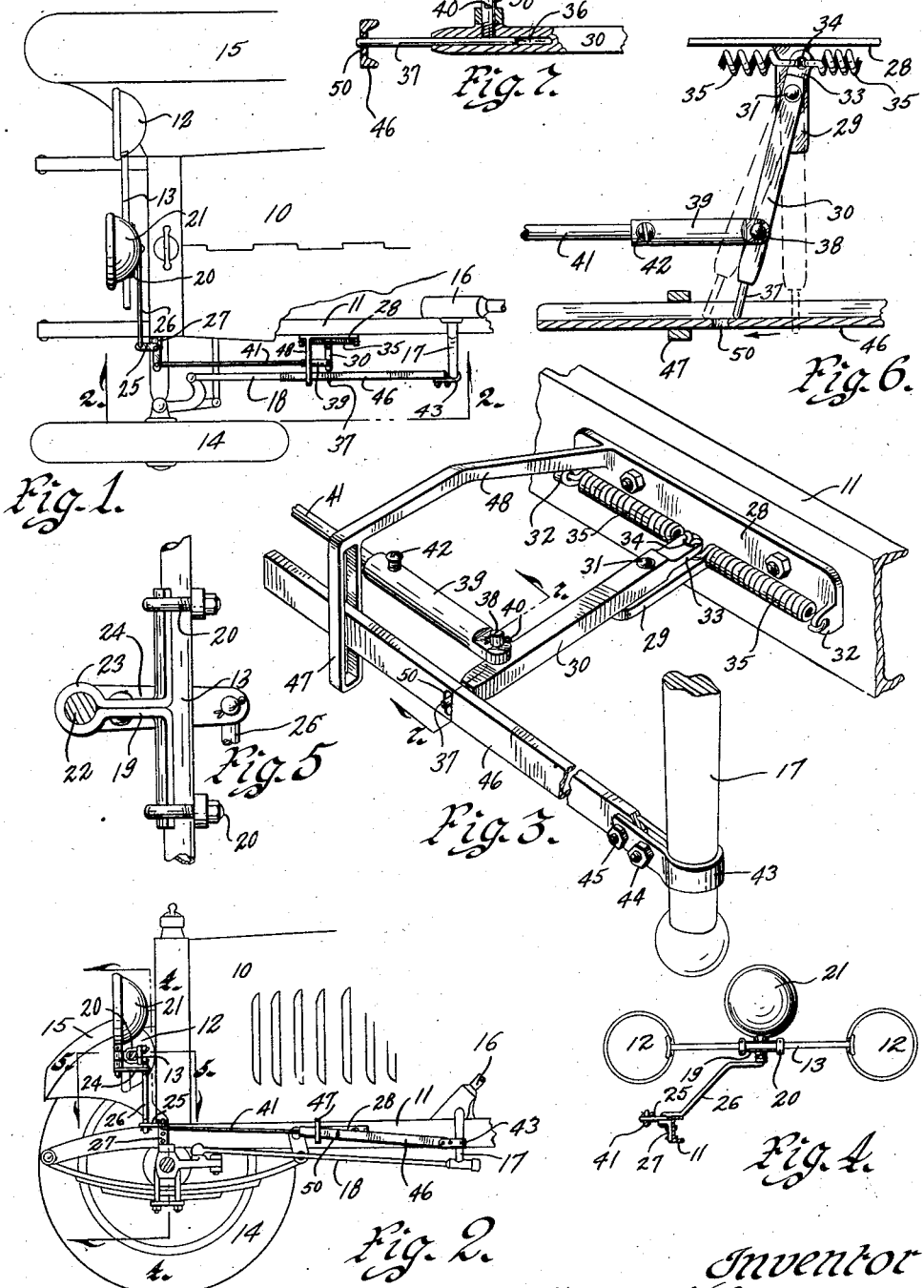

Patented Jan. 4, 1927.

1,613,064

UNITED STATES PATENT OFFICE.

JAMES ALFRED THOMAS, OF ALBERT LEA, MINNESOTA.

PILOT LIGHT.

Application filed April 14, 1926. Serial No. 101,917.

The object of my invention is to provide a pilot light for automobiles which is simple, durable and of comparatively inexpensive construction.

More particularly my invention relates to a pilot light designed to be operated on a brace and cross bar between the two front headlights of an automobile and capable of movement relative to the automobile for keeping the light on the road ahead of the car when turning a corner.

A further object is to provide means of attachment between the pilot light and the steering mechanism of the automobile, wherein even slight movement of the steering mechanism will immediately impart a movement to the pilot light and further movement of the steering mechanism after a predetermined degree, will not affect the operation of the pilot light.

Still a further object is to provide means of adjustment wherein the amount of throw or pivotal movement of the pilot light may be varied as desired.

With these and other objects in view, my invention consists in the construction, arrangement and combination of the various parts of my invention, whereby the objects contemplated are attained as hereinafter more fully set forth, pointed out in my claims, and illustrated in the accompanying drawings, in which:

Figure 1, is a top plan view of a portion of an automobile with my improved pilot light and a mechanism for operating the same shown thereon.

Figure 2, is a sectional view taken on line 2—2 of Figure 1.

Figure 3, is a perspectice view of a portion of my attachment in connection with the steering arms.

Figure 4, is a sectional view taken on line 4—4 of Figure 2.

Figure 5, is a detail sectional view taken on line 5—5 of Figure 2, showing the pivotal mounting for the pilot light.

Figure 6, is a sectional view through a portion of my attachment various positions of the device being shown in dotted lines, and Figure 7, is a detail sectional view taken on line 7—7 of Figure 3.

In the accompanying drawings I have used the reference numeral 10 to indicate generally an automobile which is provided with the chassis frame 11 and a pair of spaced headlights 12 connected together by a cross brace or tie rod 13.

The automobile 10 includes the ordinary wheels 14 and fenders 15.

The steering mechanism 16 of the automobile includes a steering arm 17 connected to the tie rod which moves the two front wheels in unison through a link 18.

My improved pilot light is attached to the steering arm 17 as I will hereinafter describe. My improved pilot light includes a bracket 19 connected to the cross brace 13 by a pair of U clamps 20.

A pilot light 21 has a spindle 22 extending downwardly therefrom and received in a bearing 23 formed on the bracket 19. The lower end of the spindle 22 has fixed to it an arm or link 24 connected to a bell crank lever 25 through the link connection 26.

The bell crank lever 25 is mounted upon the frame or chassis 11 of the automobile as at 27. Mounted upon the chassis 11 is a bracket frame 28. The bracket frame 28 includes an outwardly projecting bearing plate 29 upon which is pivoted the lever 30 upon the pivot 31.

The bracket frame 28 includes a pair of lugs or ears 32 which extend outwardly or away from the chassis 11 and are formed near the ends of the bracket frame 28.

The lever 30 on one end is contracted as at 33 and formed with an opening 34. Coil springs 35 are connected to the lever 30 through the opening 31 and have their free ends connected to the lugs 32.

The two springs 35 tend to equalize any movement of the lever 30 and to normally hold the lever 30 in a predetermined position that is, substantially at right-angles to the bracket frame 28.

The outer end of the lever 30 is formed with a bore 36 in which is slidably received a pin 37. The pin 37 may be locked in position within the bore 36 by a set screw 38. The set screw 38 also serves as a pivot for the fitting 39.

The coaction between the set screw 38 and the pin 37 is clearly illustrated in Figure 7 of the drawings. The fitting 39 is formed with an opening at one end which receives the set screw 38 and a cotter pin 40 is employed for retaining the fitting 39 upon the set screw 38.

The fitting 39 has an opening therein in which is received one end of a connection or tie rod 41. The tie rod 41 is rigidly fastened to the fitting 39 by the set screw 42.

The free end of the tie rod 41 is pivotally connected to the bell crank lever 25. From the construction of the parts just described it will be seen that movement of the lever 30 will impart movement to the tie rod 41 and thus cause the bell crank lever to operate which in turn swings the pilot light 21 upon its axis.

In order to automatically operate the lever 30 thereby operating the pilot light 21, I connect the lever 30 to the steering arm 17.

Upon the steering arm 17 I mount a collar 43 frictionally held thereon by a lock bolt 44. Pivotally connected to the collar 43 upon a bolt 45 is an operating bar 46.

The operating rod or bar 46 is channel shaped in cross section as clearly illustrated in Figure 7 of the drawing and has its free end received in a guide 47 mounted upon a bracket 48 which is formed upon the bracket frame 28. The bracket frame 28 is of course, suitably mounted upon the chassis 11 and may be secured thereto by fastenings in the form of bolts 39.

The free end of the operating bar 46 is capable of pivotal or up and down movement when the steering arm 17 is operated in the ordinary manner for steering the wheels 14.

The guide 48 limits and controls the movement of the outer free end of the bar 46. The bar 46 is connected to the pin 37. The bar 46 is formed with a slot 50 which is designed to receive the pin 37, and the slot 50 is so positioned that the lever 30 will be at substantially right-angles to the bracket 23 when the pin 37 is in the slot 50.

Movement of the steering arm 17 will, of course, impart movement of the bar 46 and such movement will first cause the pin and lever 30 to be carried therewith and as soon as the bar 46 has moved a sufficient distance forwardly or rearwardly as the case may be, the pin 37 will disengage the slot 50 and thereafter simply travel or rest against the bar 46.

The upper and lower flanges of the channel shaped bar 46 tend to guide and retain the pin 37 against becoming entirely disengaged from the bar 46. Movement of the bar 46 will cause the pin 37 and lever 30 to be moved, which in turn will operate the bell crank lever 25 through the rod 41 and thus cause the pilot light 21 to be pivoted.

It will be noted that the amount of throw or pivotal movement of the light 21 may be adjusted or varied by simply adjusting the position of the pin 37 within the bore 36.

If the pin 37 is quite long and projects through the slot 50 a considerable distance, then it will require further movement of the bar 46 to disengage the pin 37 from the slot 50.

After the pin 37 has become disengaged from the slot 50 then any further movement of the bar 46 will not effect any further movement of the pilot light 21. One of the springs 35 will keep the pin 37 against the inside of the web of the channel bar 46 while the pin is disengaged from the slot 50 and will assure the return of the pin to the slot as the bar 46 is brought back to straight ahead position.

When the bar 46 is returned to its normal position then during the movement from the moved position to the normal position the pin 37 will register with the slot 50 and the parts will return to the ordinary normal position.

The springs 35, of course, apply tension on the lever 30 and insures positive coaction between the pin 37 and the slot 50 when the bar 46 is returned to its normal position.

From the construction of the parts just described it will be seen that the amount of throw of the pilot light may be varied by shifting the position of the pin 37.

It will further be seen that the operation of the steering arm 17 will impart pivotal movement to the pilot light 21 and the amount of throw or movement of the pilot light 21 may be determined by the connection between the slot 50 and the pin 37.

Coaction between the pin 37 and the bar 46 due to the springs 35, after the pin leaves the slot 50, insures the pilot light to remain in its turned position even though the steering arm 17 is moved further.

The advantage of my construction resides in the fact that the amount of movement of the pilot light may be varied as desired and that as soon as the steering wheels begin to turn, the pilot light begins to turn and after the pilot light has been turned a sufficient amount, any further movement of the steering wheel will not affect the pilot light until after the steering wheels again begin to assume straight ahead position.

Some changes may be made in the construction and arrangement of the various parts of my invention, without departing from the real spirit and purpose of my invention, and it is my intention to cover by my claims, any modified forms of structure or use of mechanical equivalents which may be reasonably included within their scope.

I claim as my invention:

1. In a device of the class described a pilot light, a steering mechanism, means for connecting the pilot light with the steering mechanism, said means including a spring tensioned lever, a link connection between said lever and pilot light for moving said pilot light, a bar on said steering mechanism having a slot therein adapted to receive a portion of said lever wherein movement of said bar will carry with it said lever.

2. In a device of the class described a pilot light, a steering mechanism, means for connecting the pilot light with the steering mechanism, said means including a spring tensioned lever, a link connection between said lever and pilot light for moving said pilot light, a bar on said steering mechanism adapted to move therewith and having a slot therein adapted to coact with said lever, the parts being so arranged that movement of said bar will cause a predetermined amount of movement of said lever and thereafter further movement of said bar will not affect said lever.

3. In a device of the class described a pilot light, a steering mechanism, means for connecting the pilot light with the steering mechanism, said means including a spring tensioned lever, a link connection between said lever and pilot light for moving said pilot light, a bar on said steering mechanism adapted to coact with said spring tensioned lever for moving the same, a guide for one end of said bar.

4. In a device of the class described a pilot light, a steering mechanism, means for connecting the pilot light with the steering mechanism, said means including a spring tensioned lever, a link connection between said lever and pilot light for moving said pilot light, a bar on said steering mechanism having a slot therein adapted to receive a portion of said lever wherein movement of said bar will carry with it said lever, an adjustable pin in said lever wherein the amount of movement of said lever may be adjusted relative to said bar.

5. In a device of the class described a pilot light, a steering mechanism, means for connecting the pilot light with the steering mechanism, said means including a spring tensioned lever, a link connection between said lever and pilot light for moving said pilot light, a bar on said steering mechanism having a slot therein adapted to receive a portion of said lever wherein movement of said bar will carry with it said lever, said bar being channel shaped in cross section.

6. In a device for imparting pivotal movement to an automobile pilot light by the steering mechanism including a lever connected with the pilot light, a bar connected with the steering mechanism, said bar and said lever being connected together by a slot and pin connection, the parts being so arranged that movement of said bar will impart movement to said lever for a predetermined distance and thereafter further movement of said bar will not affect said lever.

7. In a device for imparting pivotal movement to an automobile pilot light by the steering mechanism including a lever connected with the pilot light, a bar connected with the steering mechanism, said bar and said lever being connected together by a slot and pin connection, the parts being so arranged that movement of said bar will impart movement to said lever for a predetermined distance and thereafter further movement of said bar will not affect said lever and means for applying tension upon said lever for tending to hold it in a normal position.

8. In a device for imparting pivotal movement to an automobile pilot light by the steering mechanism including a lever connected with the pilot light, a bar connected with the steering mechanism, said bar and said lever being connected together by a slot and pin connection, the parts being so arranged that movement of said bar will impart movement to said lever for a predetermined distance and thereafter further movement of said bar will not affect said lever, the amount of coaction between said slot and pin being adjustable for varying the amount of movement of said lever.

Des Moines, Iowa, March 25, 1926.

JAMES ALFRED THOMAS.